C. F. BOCK.
HARROW.
APPLICATION FILED SEPT. 27, 1916.

1,244,165. Patented Oct. 23, 1917.

WITNESSES

INVENTOR
CORNELIUS F. BOCK
BY
ATTORNEY

UNITED STATES PATENT OFFICE.

CORNELIUS F. BOCK, OF TEMPLETON, IOWA.

HARROW.

1,244,165.                    Specification of Letters Patent.         Patented Oct. 23, 1917.

Application filed September 27, 1916. Serial No. 122,540.

*To all whom it may concern:*

Be it known that I, CORNELIUS F. BOCK, a citizen of the United States, residing at Templeton, in the county of Carroll and State of Iowa, have invented certain new and useful Improvements in Harrows, of which the following is a specification.

This invention relates to harrows, and has for its primary object to provide a harrow construction such as will enable the harrow proper to be folded so as to occupy but a small amount of space when not in use or when being drawn through gateways, and which when used may be extended to operate upon a relatively wide space of ground.

A further object is to provide a harrow having foldable sections, wherein improved means are employed for establishing connection between the said sections. Further objects reside in the provision of a harrow of this character which is of simple and improved construction, which may be manufactured at exceedingly low cost, which has its various parts so constructed and assembled as to preclude the possibility of wear, breakage or derangement of the same, which is constructed so as to prevent the hinged sections swinging below horizontal, and which will prove thoroughly efficient in practice.

With these objects in view, together with others which will appear as the description proceeds, the invention resides in the novel formation, combination and arrangement of parts, all as will be described more fully hereinafter, illustrated in the drawings, and particularly pointed out in the claim.

In the drawings:—

Figure 1:
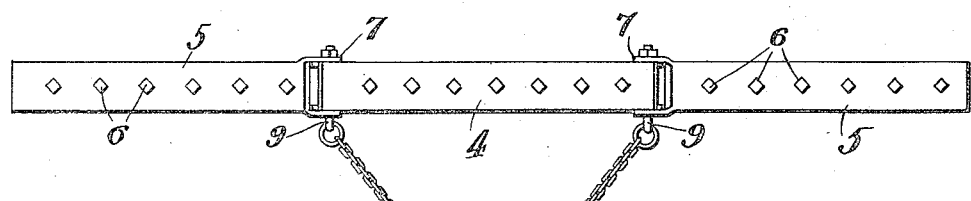
Figure 1 is a top plan view of a harrow constructed in accordance with the invention, the view showing the hinged sections extended.
Figure 2:
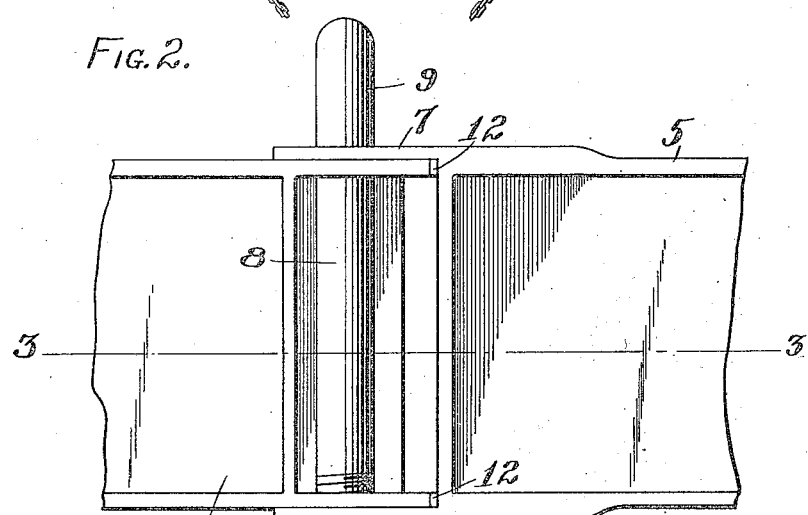
Fig. 2 is a fragmentary bottom plan view illustrating on an enlarged scale the manner in which the sections are connected.
Figure 3:
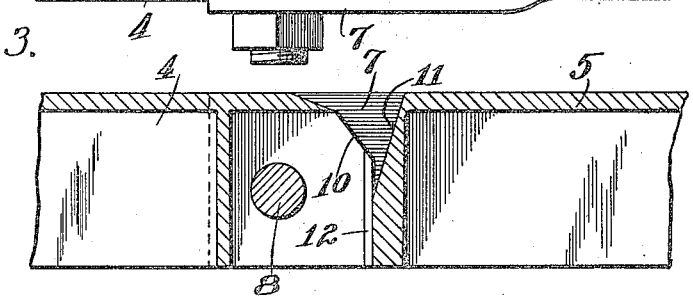
Fig. 3 is a sectional view taken on line 3—3 of Fig. 2.

Referring now to the drawings, 4 represents the central draw bar section of a harrow, and 5 the end section. These sections are preferably of relatively short length, and are formed of channel iron as shown. Each section is provided with a series of spaced apertures, through which harrow teeth 6 may be extended. It will also be understood that, if desired, disk cutters may be used in lieu of the harrow teeth.

The inner extremities of the outer sections 5 of the draw bar are provided with ears 7, the said ears projecting inwardly from the said inner ends, and are offset slightly so as to snugly engage with the lateral edges of the middle bar section 4. The ends of the longitudinal walls of the central section are extended so as to fit between the offset ears of the end sections, and the said extending portions and ears are provided with alined apertures through which connecting bolts 8 extend. These bolts are preferably formed with an eye 9 at one end, to which the draft apparatus for the harrow may be connected.

The ends of the extensions of the side walls of the central member 4 are beveled or cut away as at 10, so as to permit of the outer sections 5 swinging upwardly upon the central section, and the inner end walls of the outer sections 5 are beveled as at 11 to rest flat upon the upper face of the central section when the said end members are moved or swung inwardly upon the bolts 8. A facing strip 12 is secured upon the extremities of the extensions of the side walls of the central section 4 to form an abutment for the inner end walls of the end members 5 when the latter are swung into operative position. The engagement of the inner end walls of the sections 5 with these facing strips prevents the outer section swinging below horizontal.

From the foregoing, it is obvious that I have provided an extremely simple draw bar for harrows which may be quickly and easily operated, and which will prove practical in use. The outer sections of the harrow draw bar may be raised and swung rearwardly upon their pivot bolts, and will be supported in inwardly inclined position by the upper surface of the channel member constituting the central section 4. When in this position, the harrow will occupy but a small amount of space, and may be drawn through narrow gate ways. The hinge bolts 8, in addition to supplying a pivotal support for the outer sections, also provide means for the attachment of draft animals or apparatus to the harrow.

While the present illustration is that of the preferred embodiment of the invention, it is obvious that various changes in the minor details of construction and arrangement of parts may be made, if desired, without departing from the spirit of the invention or exceeding the scope of the claim, and the right to make such variation is hereby reserved.

What is claimed is:

In a harrow, a central bar, an outer section, the said bar and section being formed of channel members, ears projecting inwardly from the end of the outer section, a pin connecting said ears to the adjacent end of said central bar, the side walls of the central bar being extended, facing strips on the extremities of said extensions, and the said facing strips being adapted to be engaged by the adjacent end wall of the outer section to limit the latter against swinging below horizontal.

In testimony whereof I affix my signature in presence of two witnesses.

CORNELIUS F. BOCK.

Witnesses:
M. J. DAEGES,
CHAS. DOYLER.

Copies of this patent may be obtained for five cents each, by addressing the "Commissioner of Patents, Washington, D. C."